(12) United States Patent
Bienert et al.

(10) Patent No.: US 6,643,989 B1
(45) Date of Patent: Nov. 11, 2003

(54) ELECTRIC FLUSH-MOUNTED INSTALLATION UNIT WITH AN ANTENNA

(76) Inventors: Renke Bienert, Schwabenstrasse 51, Schoenaich (DE); Fritz Jauss, Cheruskerstrasse 56, Schoenaich (DE)

( * ) Notice: Subject to any disclaimer, the term of this patent is extended or adjusted under 35 U.S.C. 154(b) by 0 days.

(21) Appl. No.: 09/646,477
(22) PCT Filed: Feb. 23, 1999
(86) PCT No.: PCT/EP99/01161
§ 371 (c)(1), (2), (4) Date: Nov. 15, 2000
(87) PCT Pub. No.: WO99/48168
PCT Pub. Date: Sep. 23, 1999

(51) Int. Cl.$^7$ .................................................. E04B 1/38
(52) U.S. Cl. ............................. 52/712; 52/713; 52/715; 343/769; 343/789; 343/846; 343/873
(58) Field of Search .......................... 52/712, 713, 715; 343/769, 709, 873, 846

(56) References Cited

U.S. PATENT DOCUMENTS

| | | | |
|---|---|---|---|
| 4,733,245 A | * 3/1988 | Mussler | 343/769 |
| 5,061,938 A | * 10/1991 | Zahn et al. | 343/700 MS |
| 5,061,939 A | * 10/1991 | Nakase | 343/700 MS |
| 5,079,559 A | * 1/1992 | Umetsu et al. | 343/702 |
| 5,465,100 A | * 11/1995 | Remondiere et al. | 343/769 |
| 5,585,806 A | * 12/1996 | Ogino et al. | 343/700 MS |
| 5,905,471 A | * 5/1999 | Biebl et al. | 343/769 |
| 6,014,113 A | * 1/2000 | Orchard et al. | 343/841 |
| 6,087,989 A | * 7/2000 | Song et al. | 343/700 MS |
| 6,144,344 A | * 11/2000 | Kim et al. | 343/770 |
| 6,160,522 A | * 12/2000 | Sanford | 343/769 |

\* cited by examiner

*Primary Examiner*—Carl D. Friedman
*Assistant Examiner*—Yvonne M. Horton

(57) ABSTRACT

A flush mounted installation unit in which an operating portion of the installation unit such as the supporting plate, the covering or switch unit is designed as an antenna so that the unit can perform the dual function of housing and mounting the components for use in a control system and providing an antenna for a radio link between the central control unit and the components.

2 Claims, 3 Drawing Sheets

ELECTRIC FLUSH-MOUNTED INSTALLATION UNIT WITH AN ANTENNA

BACKGROUND OF THE INVENTION

1. Field of the Invention

The invention relates to an installation unit, in particular an electric flush-mounted installation unit.

2. Description of the Prior Art

Installation units of the type mentioned in the introduction are used in a control system for a building or for one or more rooms in a building. Such control systems are provided with at least one central control unit and with at least two components connected to the central control unit via a radio link. Such control systems serve inter alia for regulating temperature.

With the aid of the installation unit mentioned in the introduction, the central control unit and also the components of the control system which are connected to the central control unit via a radio link are installed e.g. on walls of the rooms whose temperature level is to be regulated. Such an installation unit must therefore enable simple installation of a central control unit or a component of the control system.

SUMMARY OF THE INVENTION

Taking this as a departure point, the present invention is based on the problem of providing an installation unit for control systems which has been developed further and enables novel functions.

In order to solve this problem, the installation unit mentioned in the introduction is characterized by the fact that an assembly, in particular a metallic or metalized supporting plate, of the installation unit is designed as an antenna. A switch attachment of the installation unit may also be designed as an antenna.

As already mentioned, at least one central control unit of the control system for a building is connected to further components via a radio link. Accordingly, the signals are transmitted between the central control unit and the components. By virtue of the fact that an assembly of the installation unit is designed as an antenna, it is possible for the actual transmitting and receiving devices of the central control unit or components of the control system that is or are to be installed with the aid of the installation unit not to have to have a separate antenna. The antenna function is accordingly performed directly by the installation unit. It is accordingly the intention of the invention to supply the installation unit with a new function. Accordingly, the installation unit no longer serves merely for installation of the central control unit or components of a control system, rather the installation unit, in particular a metallic or metalized supporting plate thereof, participates in the signal transmission between the central control unit and the components of the control system.

Preferred developments of the invention emerge from the subclaims and the description. An exemplary embodiment of the invention is explained in more detail below with reference to the drawing, in which:

DETAILED DESCRIPTION OF THE PREFERRED EMBODIMENTS

Figure 1:
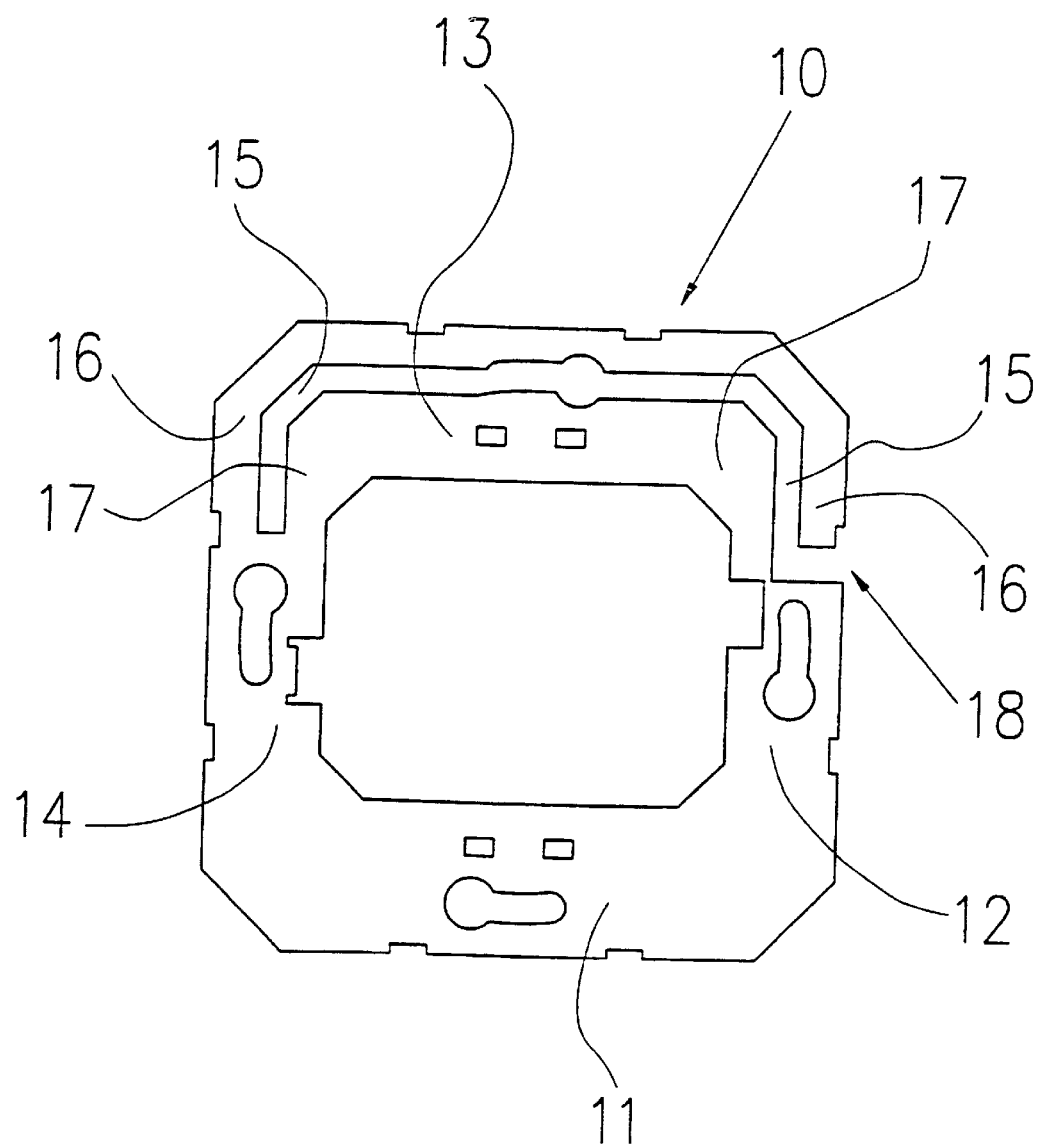
FIG. 1 shows a metallic supporting plate—configured according to the invention—of an installation unit according to the invention in plan view.

The elements of an installation unit, namely an electric flush-mounted installation unit, which are illustrated in the drawing serve for installation of a central control unit and also components of a control system which are connected to the central control unit via a radio link. Signals are transmitted between the central control unit and the components.

An electric flush-mount installation unit is provided inter alia with a metallic supporting plate 10. The metallic supporting plate 10 is designed as a frame as shown in FIG. 1. The frame is formed by a total of four limbs 11, 12, 13, 14, mutually opposite limbs 11, 13, and 12, 14 running parallel to one another and adjacent limbs 11, 12, and 12, 13 and 13, 14 and 14, 11 being arranged at right angles to one other. The limbs 11, 12, 13, 14 of the supporting plate 10 accordingly form a frame having an approximately rectangular configuration.

Instead of the metallic supporting plate 10, a metalized supporting plate may also be provided. This may be e.g. a supporting plate made of plastic which is provided at least in regions with a metallic layer. Thus, such a supporting plate, made of plastic maybe subjected e.g. to metallic vapour deposition. For the sake of simplicity, only the metallic supporting plate 10 is referred to below, but a metalized supporting plate can also be used.

The metallic supporting plate 10 of the electric flush-mount installation unit is, according to the invention, designed as an antenna. To that end, the metallic supporting plate 10 designed as a frame is provided with a slot 15 extending at least in regions along the periphery of the frame.

As shown in FIG. 1, the slot 15 runs centrally within the limbs 13 and 12, 14 of the supporting plate 10. The slot 15 accordingly extends across three limbs, in which case it extends only in regions across the limbs 12, 14 running parallel to one another. By contrast, the slot 15 extends continuously across the limb 13 which connects the limbs 12, 14.

The limbs 12, 13 and 14 are accordingly subdivided in the region of the slot 15, namely into an outer limb 16 and an inner limb 17.

As shown in FIG. 1, the slot 15 is directed to the outside in a section 18 of the metallic supporting plate 10 designed as a frame. In this section 18, the slot 15 breaks through the frame, namely the outer limb 16 of the limb 12, to the outside.

Figure 2:
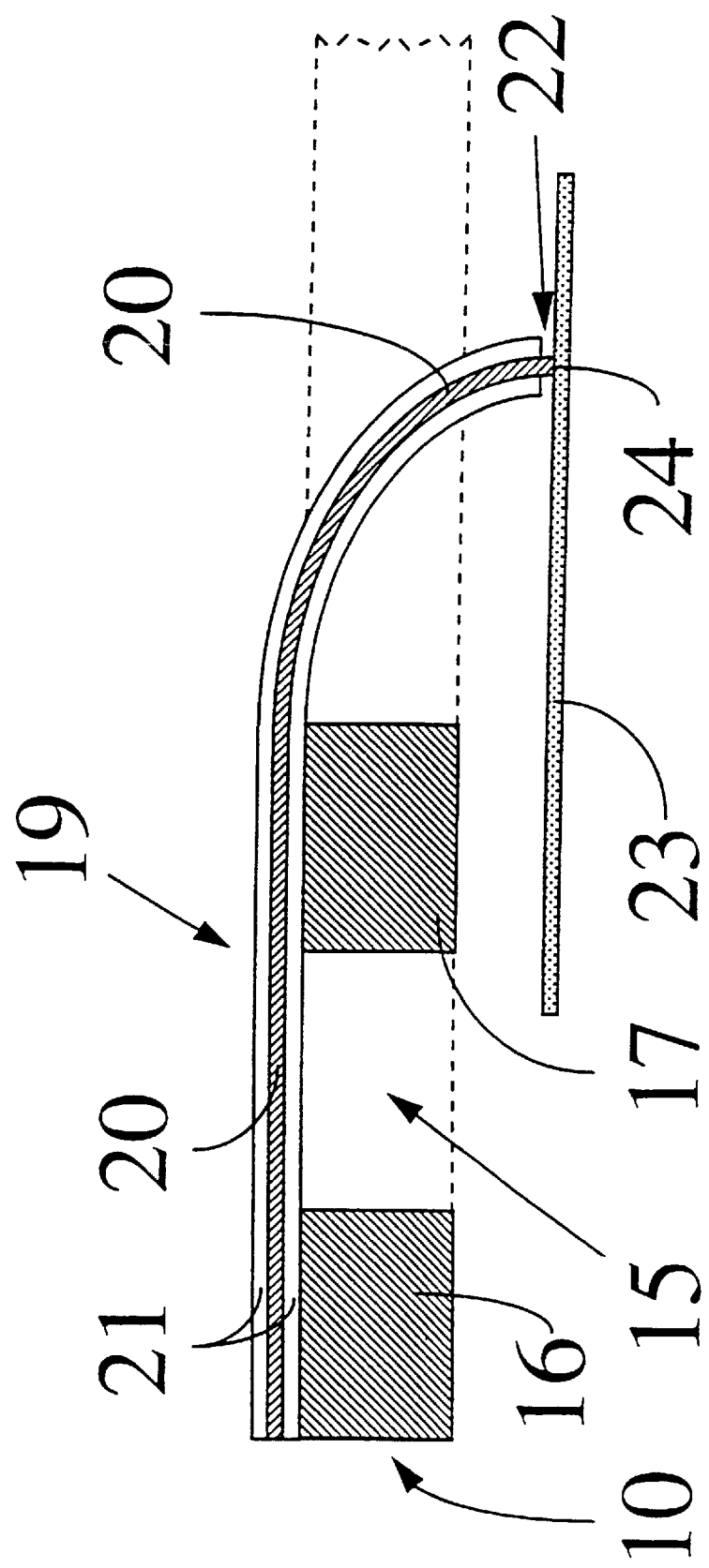
FIG. 2 shows the metallic supporting plate as shown in FIG. 1 in a cross section together with a sheet for electrical adaptation of the supporting plate.

A metallic supporting plate configured in this way already fulfils the function of an antenna. In order to adapt the antenna to the specific requirements, in particular in order to adapt the complex input impedance, a sheet 19 is assigned to the supporting plate 10 as shown in FIG. 2. The sheet 19 covers the slot 15 in regions in the region of the limb 12, namely in direct proximity to the section 18.

According to the invention, the sheet 19 comprises a metallic layer, namely a copper layer 20, which is enclosed by two insulator layers 21. With its lower insulator layer 21, the sheet 19 bears on the outer limb 16 and inner limb 17 of the supporting plate 10 in the region of the limb 12 and covers the slot 15 in this region. Between the outer limb 16 and the sheet 19, on the one hand, and the inner limb 17 and the sheet 19, on the other hand, a capacitor is formed in each case, with the aid of which the supporting plate 10 designed as an antenna can be electrically adapted. This adaptation can be effected on the one hand by way of the width of the sheet 19, and on the other hand by way of the thickness of the insulator layers 21 or the choice of material for the insulator layers 21.

As shown in FIG. 2, the sheet 19 bears on the outer limb 16 and inner limb 17 without electrical contact. In the region of an end 22 of the sheet 19, the copper layer 20 makes contact with a printed circuit board 23, e.g. via soldering, it being possible for the printed circuit board 23 to bear assemblies of a transmitting and/or receiving device. The contact between the printed circuit board 23 and the copper sheet 20 is illustrated as connecting point 24 in FIG. 2.

Figure 3:
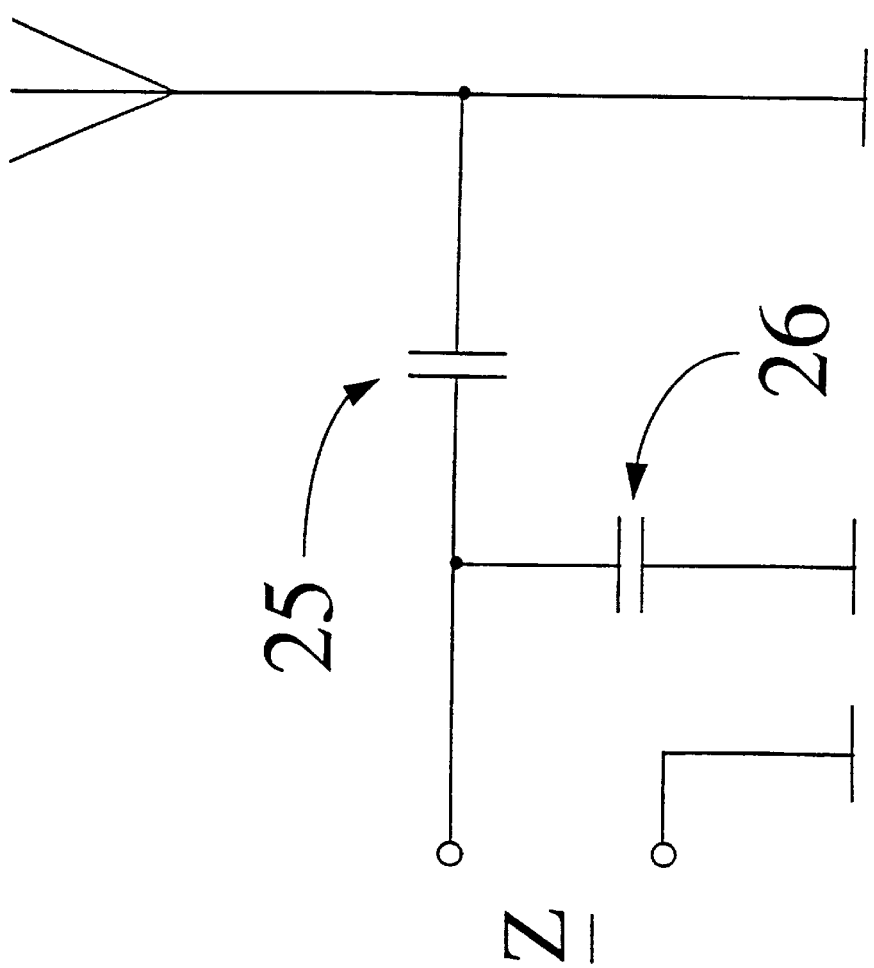
FIG. 3 shows an electrical equivalent circuit diagram of the installation unit according to the invention.

FIG. 3 shows an electrical equivalent circuit diagram of the antenna with adapting circuit, said antenna being formed from the metallic supporting plate 10 and from the sheet 19. In terms of DC voltage, the supporting plate 10 and the sheet 19 are at a ground potential. The capacitance formed between the outer limb 16 and the sheet 19, on the one hand, and the capacitance formed between the inner limb 17 and the sheet 19, on the other hand, are illustrated as capacitors 25, 26 in FIG. 3. The capacitance of the capacitors 25, 26 can be adapted by suitable selection of the material for the insulator layers 21. This adaptation can also be effected by way of modification of the thickness of the insulator layers 21. Furthermore, it is possible to adapt the width of the covering of the slot 15 by the sheet 19. Such modifications enable the complex input impedance Z of the unit-acting as an antenna—comprising the supporting plate and the sheet to be adapted to the specific requirements. The complex input impedance Z is ideally 50 ohms.

The above-described unit comprising the supporting plate 10 configured according to the invention and the sheet 19 operates as a shortened λ/4 antenna at a signal transmission frequency of 433 MHz.

In a departure from the exemplary embodiment illustrated it is also conceivable for a covering (not illustrated) of the installation unit to be designed as an antenna. Thus, a switch unit, pushbutton unit or operating unit of the installation unit can perform the antenna function.

List of Reference Symbols:

| | |
|---|---|
| 10 | Supporting plate |
| 11 | Limb |
| 12 | Limb |
| 13 | Limb |
| 14 | Limb |
| 15 | Slot |
| 16 | Outer limb |
| 17 | Inner limb |
| 18 | Section |
| 19 | Sheet |
| 20 | Copper layer |
| 21 | Insulator layer |
| 22 | End |
| 23 | Printed circuit board |
| 24 | Connecting point |
| 25 | Capacitor |
| 26 | Capacitor |

What is claimed is:

1. An installation unit including:
   a first portion for mounting components of a system;
   a second portion including a metallic or metalized supporting plate designed as a frame, wherein the frame is provided with a slot formed as an aperture entirely through a surface of the frame and extending at least in regions along the periphery of the frame, said second portion mounting the installation unit, said second portion and being simultaneously designed as an antenna; and
   conductive means connecting the antenna to the first portion to provide signals for the components.

2. In a control system having a central unit and a remote unit to be in radio communication, both the central unit and the remote unit comprising:
   an installation unit for housing the central and remote units, each installation unit including a first portion for mounting components of the system and a second portion including a metallic or metalized supporting plate designed as a frame, wherein the frame is provided with a slot formed as an aperture entirely through a surface of the frame and extending at least in regions along the periphery of the frame, said second portion mounting the installation unit, and being simultaneously designed as an antenna; and
   a signal conductor connected from the second portion to the first portion to transmit radio signals between the antenna and the components.

\* \* \* \* \*